(12) United States Patent (10) Patent No.: US 8,172,240 B2
Zimmerman et al. (45) Date of Patent: May 8, 2012

(54) TRANSPORT APPARATUS FOR TRANSPORTING A VIBRATION COMPACTOR

(75) Inventors: Rainer Zimmerman, Bornich (DE); Heinz Nick, Emmelshausen (DE)

(73) Assignee: BOMAG GmbH, Boppard (DE)

( * ) Notice: Subject to any disclaimer, the term of this patent is extended or adjusted under 35 U.S.C. 154(b) by 842 days.

(21) Appl. No.: 11/896,978

(22) Filed: Sep. 7, 2007

(65) Prior Publication Data

US 2008/0061522 A1 Mar. 13, 2008

(30) Foreign Application Priority Data

Sep. 7, 2006 (DE) .................... 20 2006 013 718 U

(51) Int. Cl.
*B62B 1/26* (2006.01)
(52) U.S. Cl. ..................... 280/43.1; 280/63; 280/47.131
(58) Field of Classification Search ............. 280/DIG. 2, 280/79.5–79.7, 79.11, 47.131, 47.15, 47.17, 280/47.21, 47.24, 47.26, 47.27, 47.29, 63, 280/64, 43, 43.1, 43.11, 43.14, 79.2–79.4
See application file for complete search history.

(56) References Cited

U.S. PATENT DOCUMENTS

| | | | | |
|---|---|---|---|---|
| 1,921,420 A * | 8/1933 | Macourek | .................... | 280/43.1 |
| 2,711,152 A * | 6/1955 | McGregor | .................... | 440/53 |
| 2,838,320 A * | 6/1958 | Sosalla | .................. | 280/47.24 |
| 2,903,147 A * | 9/1959 | Davis, Jr. | ..................... | 414/490 |
| 3,071,387 A * | 1/1963 | Beaman et al. | ............ | 280/47.24 |
| 3,260,533 A * | 7/1966 | Ryder | ......................... | 280/43.1 |
| 3,380,752 A * | 4/1968 | Goettl et al. | .................... | 280/43 |
| 3,416,417 A * | 12/1968 | McIlrath et al. | ................ | 404/85 |
| 3,673,931 A * | 7/1972 | Dening et al. | ............ | 404/133.1 |
| 4,008,507 A * | 2/1977 | Smith | .............................. | 16/34 |
| 4,249,282 A * | 2/1981 | Little | ................................ | 16/32 |
| 4,367,880 A * | 1/1983 | Harding | ................... | 280/47.131 |
| 6,062,802 A * | 5/2000 | Aenchbacher | ............... | 414/490 |
| 6,293,729 B1* | 9/2001 | Greppmair | ................ | 404/133.1 |
| 6,347,907 B1* | 2/2002 | Halstead | ......................... | 404/85 |
| 7,111,851 B2* | 9/2006 | Duncan | ...................... | 280/47.26 |
| 2001/0035620 A1* | 11/2001 | Wilson | ......................... | 280/79.7 |
| 2007/0187915 A1* | 8/2007 | Filiatrault | ............... | 280/47.131 |

FOREIGN PATENT DOCUMENTS

DE 297 07 017 U1 8/1997
DE 201 05 768 U1 7/2001

* cited by examiner

*Primary Examiner* — J. Allen Shriver, II
*Assistant Examiner* — Travis Coolman
(74) *Attorney, Agent, or Firm* — Baker & Hostetler LLP

(57) ABSTRACT

The invention relates to a transport apparatus for a vibration compactor that comprises an axle with a wheel being arranged on each of its ends. The transport apparatus of the invention is advantageous, because it does not require any reconfiguration work, special tools or other special measures for transporting the vibration compactor.

13 Claims, 9 Drawing Sheets

TRANSPORT APPARATUS FOR TRANSPORTING A VIBRATION COMPACTOR

CROSS-REFERENCE TO RELATED APPLICATIONS

This application claims priority of German Patent Application DE202006013718.1 filed in Germany on Sep. 7, 2006, the entire disclosure of which is incorporated herein by reference.

FIELD OF THE INVENTION

The invention relates to a transport apparatus for transporting a vibration compactor, with the transport apparatus comprising an axle, with a wheel each being arranged on each of its ends.

BACKGROUND OF THE INVENTION

The vibration compactor of this kind is usually used for compacting soil and is known for example from DE 201 05 768 U1. Such a vibration compactor comprises a compactor head which carries a drive motor. The compactor foot is connected to the compactor head via an elastic bellows and a connecting rod which is not visible. The vibration compactor performs substantially vertical vibrations through a built-in drive and comprises a guide bracket arranged on the compactor head for guidance, by which the guidance of the vibration compactor is enabled by a user. The weight of such a vibration compactor usually lies in the range of between 40 to 90 kg. Such a range can partly be exceeded on both sides however. The bulky appearance and the high weight of a vibration compactor cause a transport problem to the users especially in uneven construction site terrain. Carrying the vibration compactor back and forth usually entails a considerable amount of physical exertion, so that there has been a demand for alternative possibilities for transport.

In this connection it is known from DE 297 07 017 U1 to additionally provide the compactor with a permanent single-axle running gear which additionally supports the vibration compactor. This embodiment is disadvantageous concerning the complex configuration, the high need for space which is especially disturbing in narrow construction passages such as open cuts or corners, and the thus ensuing high costs. Moreover, such a compactor system cannot be used or retrofitted in conventional types of vibration compactors. DE 297 07 017 U1 requires a completely new constructional approach, so that this running gear is not of interest for vibration compactors of this kind.

It is further known from the state of the art to fasten holding plates via the fastening screws to the compactor foot of the vibration compactor. Such holding plates are used for guiding an axle with two wheels, with the holding plates being mounted on the vibration compactor prior to a transport step and removed again after the completed transport. After attaching the two holding plates, the vibration compactor is tilted forward (i.e. in the direction of movement of the vibration compactor) and the axle with the two terminal wheels is pushed beneath the holding plates.

Finally, the vibration compactor is tilted in a rearward manner (i.e. against the direction of movement of the vibration compactor), so that the axle is loaded with the weight of the vibration compactor. Further backward tilting leads to a lifting of the foot. The vibration compactor can now be moved like a sack barrow, with the guide bracket of the vibration compactor being used for guiding the vibration compactor which is hooked into the axle. The disadvantageous aspect in this embodiment is that a considerable amount of time is needed in order to attach the holding plates to the foot of the vibration compactor. Moreover, there is an increased risk of accident because the installation work is often performed in a very negligent manner due to adverse circumstances, missing tools, etc. Furthermore, the user must carry the parts of the holding plates, wheels and wheel axle with himself at all times, including the respective tools. In addition to the high amount of installation work concerning the mounting and dismounting, it is necessary for the user in this system to continually carry a comprehensive assortment of parts with himself. As can be expected, there are frequent failures of this transport system due to loss or wear and tear of parts, mismatched tools or unfavorable mounting environments, so that the user is finally also subject to higher physical exertion because it is often necessary to forgo the support by the transport system.

SUMMARY OF THE INVENTION

It is therefore the object of the present invention to make the transport of a vibration compactor more secure and at the same time more efficient concerning convenience in operation and transport time.

This object is achieved by a transport apparatus in accordance with the independent claim. Preferred further developments can be found in the dependent claims.

In accordance with the invention, the transport apparatus comprises a transport rocker which is arranged in the axial direction of the axle between the two wheels, comprising a compactor foot receptacle with a compactor foot wraparound, with the compactor foot wraparound being opened in a first transport direction of the transport apparatus and with a rocker suspension with a control cam which determines a loading and transport position for the axle in the manner that by lifting the transport rocker the axle partly runs through the control cam. The transport apparatus in accordance with the invention thus allows transporting a vibration compactor without having to perform any reconfiguration work on the vibration compactor or on the transport apparatus. It is thus also no longer necessary to keep a store of tools and mounting parts or to carry the same with oneself in order to transport a vibration compactor with the transport apparatus in accordance with the invention. Moreover, the transport apparatus in accordance with the invention enables a transport which is independent of the type of vibration compactor because the transport apparatus is applied to the compactor foot receptacle, wraps around a partial section of the compactor foot with the compactor foot wraparound, and thus does not require any additional mounting parts or fixed connections via screwed joints for example. Wheels with wide tires further allow an especially advantageous all-terrain versatility. A compactor foot wraparound shall be understood within the terms of the invention to be an arrangement which wraps around a portion of the foot plate of the vibration compactor in a clamp-like manner or overlaps a portion of the bottom side of the foot, the lateral surface of the foot and the upper side of the foot. This is preferably possible with a profile with a U-shaped cross section for example. The compactor foot wraparound can also be made of several parts and be formed for example by several hook-like elements.

It is preferred that the compactor foot receptacle is a receptacle shoe which is arranged to receive the compactor foot in an interlocking manner. A receptacle shoe grasps around the compactor foot not only in a partial section against the first direction of transport, but also at the sides of the vibration compactor foot. This embodiment is advantageous in several respects. On the one hand, a receptacle shoe allows the interlocking receiving of a partial section of the vibration compactor foot, with the side of the vibration compactor foot being received by the receptacle shoe completely against the first direction of transport and the two side areas of the vibration compactor foot at least in a partial section. Receiving by interlocking is especially secure and stable, so that this embodiment offers considerable operating advantages for the user. On the other hand, a receptacle shoe is especially suitable for variable receiving of different vibration compactor feet. It is thus especially simple to transport different types of vibration compactors or vibration compactors with different compactor feet with one and the same transport device in accordance with the invention.

It is especially advantageous when the control cam is arranged in such a way that the transport rocker is moved in a two-phase movement relative to the axle from the loading position to the transport position, with a sliding phase following an initial lifting phase. In this preferred two-phase sequence of movements, the transport rocker is lifted at first in relation to the axle. This lifting process is advantageously caused by the wraparound, which, after a partial section of the vibration compactor foot has been wrapped around, lifts the transport rocker in relation to the axle. This movement is cause for example by a tilting movement of the vibration compactor in the direction of forward movement of the vibration compactor. The lifting process is followed by a sliding phase in which the axle slides into the transport position. This movement can also be provided by a tilting movement of the vibration compactor. Furthermore, gravity-induced sliding movements are also possible.

The transport rocker is preferably held at two points in the axle, with the compactor foot receptacle being arranged in the axial direction of the axle between the first and second bearing. Such a bearing of the transport rocker between two rocker bearings which join the transport rocker with the axle is especially stable. This applies especially with respect to hazardous tilting movements or lateral oscillations of the vibration compactor in the transport direction. It is especially advantageous in this respect to space the two bearing points as far as possible from each other. An arrangement has proven to be especially reliable which is delimited in the axial direction of the axle by one wheel each, with one rocker suspension being adjacent to the two mutually facing sides of the coaxially arranged wheels and with the compactor foot receptacle being arranged between the two rocker suspensions. For this purpose, the rocker suspension is preferably provided with two control plates with a control cam each.

The elements forming the first and second bearing preferably delimit the compactor foot receptacle in the axial direction of the axle. As a result of the combined function of said elements for bearing on the one hand and for delimiting the compact foot on the other hand, a lower number of components is necessary for producing such a transport apparatus and consequently there are lower production costs.

In an especially preferred embodiment, the control cam is a two-leg oblong hole, with the axle being held in the loading position in the region of the first leg and the transport position in the region of the second leg. This embodiment is characterized by an especially high operational reliability and by a comparatively cheap production. The preferred two-phase sequence of movement of the transport rocker is determined in this embodiment by the two oblong holes, with the first movement phase being assigned substantially to the first oblong hole and the second sequence of movements is assigned substantially to the second oblong hole. Preferably, the two mutually averted outer corner points of the two oblong holes determine either the loading position (in the case of the first leg) or the transport position (in the case of the second leg).

A two-leg oblong hole is especially advantageous which is substantially L-shaped. The separation between lifting phase and a sliding phase is achieved especially well in the case of an L-shaped oblong hole. The L-shaped oblong hole ensures further that the transporting device will slide into the transporting position only after overcoming a dead center in the sequence of movements from the loading position to the transporting position. In the case of a substantially L-shaped oblong hole, there is an especially sharp separation between the lifting movement and the sliding movement. The dead center lies in the area of the L-shaped oblong hole in which the two legs meet each other. This embodiment has the advantage for the user that the transport apparatus is not switched over in an unintended manner into the transporting position until exceeding the dead center by the axle guided in the L-shaped oblong hole on the one hand or remains in a "half position", i.e. in a position which lies between the loading position and the transporting position and is thus ambiguous. It can rather be determined in an L-shaped oblong hole that it will move either in the transporting position or the loading position, depending on whether or not the dead center has been overcome.

Preferably, the two legs are positioned at an acute angle with respect to each other. An acute angle within the terms of this invention is smaller than or equal to 90°. Although it is possible to use an obtuse angle, an acute angle especially in the range of 90° to 45° and more preferably in the range of 90° to 75° is especially characterized by an especially soft and reliable sequence of movement of the transport rocker from the loading position to the transport position. This leads to an especially high operating comfort for the user.

In a preferred further development, the oblong hole is provided in the region of the second leg with at least one bulging for securing the displacement position of the axle during the transport. As a result of said bulging, the axle is prevented from an inadvertent "reverse slippage" into the oblong hole, which was frequently observed especially in the case of very uneven terrain. Moreover, the axle is supported therein when the transport device is pushed in combination with the vibration compactor in the first direction of transport. Said bulging in the second leg extends substantially in the direction of the oblong hole in the first leg or away from the ground on which the transport device is standing and transversally to the transport direction. In the state when loaded with a vibration compactor, the axle is pressed into the bulging by the dead weight of the vibration compactor or for overcoming the bulging in the second leg (which is undesirable during the transport) it is thus necessary that the dead weight of the vibration compactor be overcome.

It is especially advantageous when the first leg of the two-leg oblong hole is arranged in such a way that the compactor foot receptacle is held in the loading position in a substantially projection-free manner relative to the outside circumference of the wheels. It is thus ensured that the transport rocker will not dig into the soil during the loading process or will receive soil material in the transport rocker. It is advantageous with respect to an especially simple loading when the compactor foot receptacle is virtually flush with the outside circumference of the wheels in the loading position or is flush with the outside circumference of the wheels in such a way that the wheels protrude beyond the compactor wheel receptacle in the region of 0 to 3 cm for example, ideally in the range of 0 to 1.5 cm. This ensures on the one hand a reliable loading and on the other hand this arrangement takes into account the usually loose ground which is laced with smaller stones.

A further preferred further development provides that the outside edge of the compactor foot receptacle is arranged in the transporting direction in the loading position of the transport rocker at a distance to the axle in the range of 100% and 90% of the wheel diameter and especially in a range of between 98% and 94% of the wheel diameter. This ensures on the one hand sufficient ground clearance for positioning the loading apparatus. On the other hand, the comparatively small distance of the transport rocker and especially the compactor foot receptacle to the base enable an easier receiving of the vibration compactor in the compactor foot receptacle because the vibration compactor does not have to be lifted.

Preferably, the outside edge of the compactor foot receptacle is arranged against the transporting direction in the transport position (mentioned hereinafter partly also as transporting direction) of the transport rocker at a distance to the axle in a range of 80% and 50% of the wheel diameter and especially in a range of between 70% and 60% of the wheel diameter. As a result of this positioning of the transport rocker or the compactor foot receptacle, a considerable ground clearance is obtained between the base on which the transport apparatus is moved and the "lowest" point of the transport apparatus orthogonally to the base. A large ground clearance helps the user to direct the transport apparatus loaded with a vibration compactor over uneven terrain because it is thus ensured that rocks and the like can easily be rolled over and the transport apparatus will not get stuck on such small obstructions.

A further advantageous embodiment comprises a compactor foot wraparound with a fork with two gripper arms. Such a fork-like configuration of the compactor foot wraparound allows for a high variability of the transport apparatus in accordance with the invention concerning different types of vibration compactors or different compactor feet with varying working widths. Such a compactor foot wraparound wraps around not only a partial section in the rear area of the compactor foot (relative to the traveling speed of the vibration compactor), but it further wraps around a partial area of the connecting part between compactor foot and upper mass with the two fork arms. Said wraparound stabilizes the vibration compactor in an especially effective manner against lateral movements parallel to the axle. These can be rolling movements of the vibration compactor for example.

For reasons of production technique it is advantageous when the transport rocker has an integral configuration and is formed by a bending process. It is thus possible to cut a transport rocker blank from a plane metal part and to bring the same into the desired form by a subsequent bending process. The number of the parts required for production and the working steps is thus reduced considerably, thus allowing for an especially cost-effective production of the transport apparatus in accordance with the invention.

BRIEF DESCRIPTION OF THE DRAWINGS

The invention is explained below in closer detail by reference to embodiments shown schematically in the drawings, wherein.

The same components are provided with the same reference numerals in the embodiments as shown below. For reasons of clarity, the components repeated in the figures are not designated individually in each figure.

DETAILED DESCRIPTION

Figure 1:
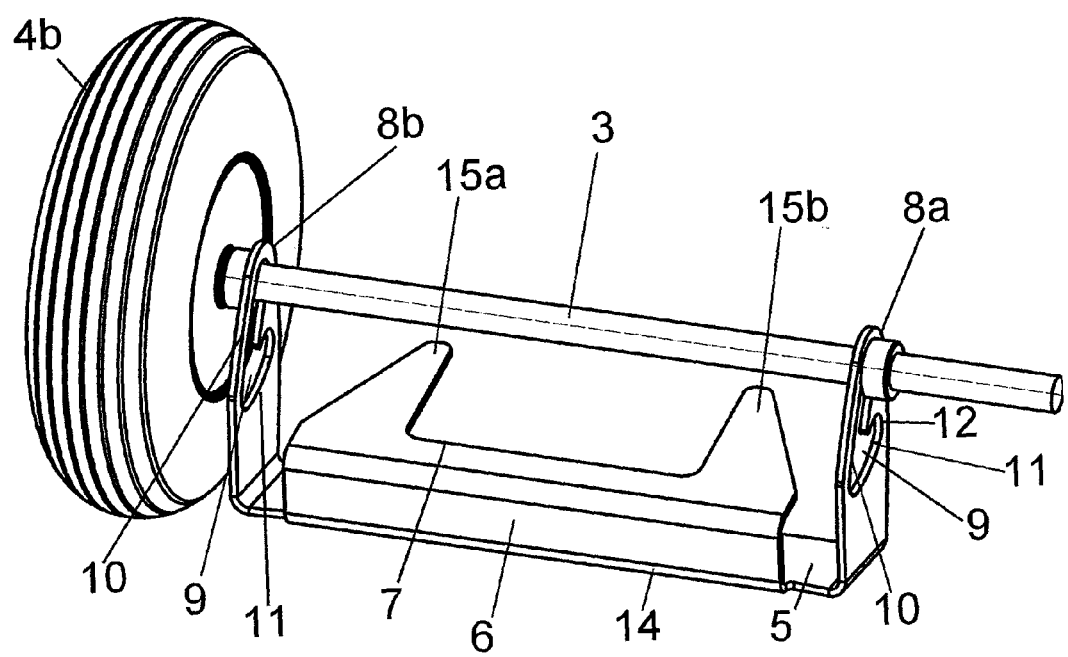
FIG. 1 shows a perspective side view of a transport rocker in an oblique way from behind in the loading position.
Figure 2:
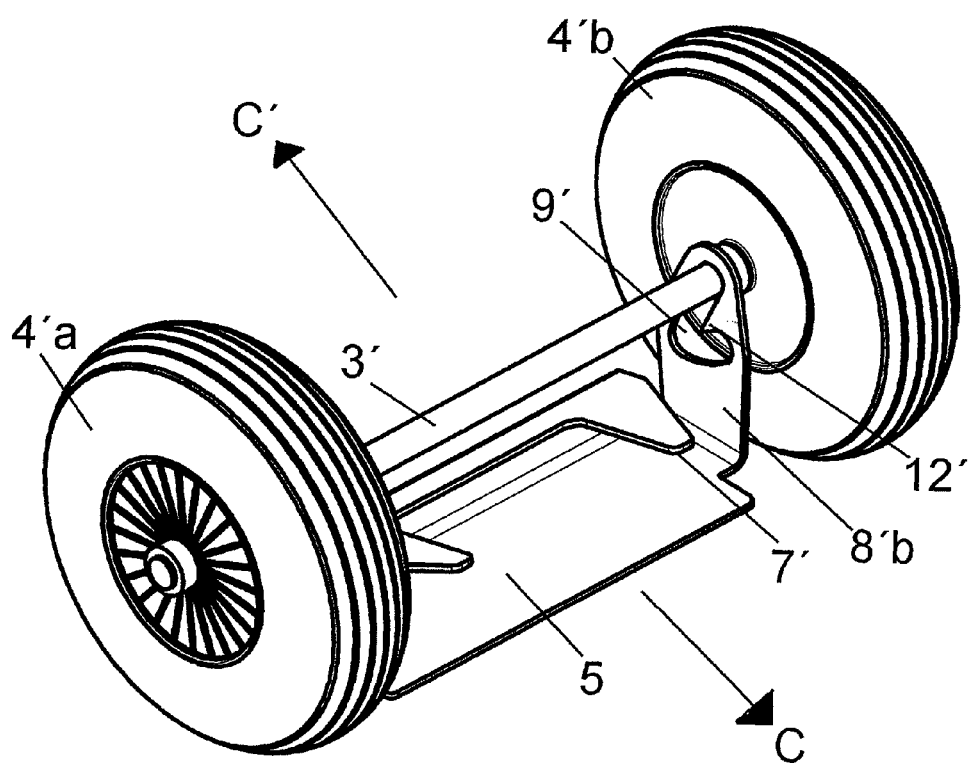
FIG. 2 shows a perspective side view of a transport apparatus in an oblique way from the front in the loading position.

FIG. 1 shows a partial section of a first embodiment of a transport apparatus with an axle (3) (which is only indicated towards the right side of the illustration and is not shown completely), wheels (4b; for reasons of clarity of the illustration only one wheel is indicated with a broken line), a transport rocker (5), a compactor foot receptacle (6), a compactor foot wraparound (7) with fork consisting of two fork arms (15a, 15b), an outside edge (13) in the direction of a second transporting direction (C'), and a two-point rocker suspension (8a, 8b), with each of the suspension elements (8a and 8b) comprising one oblong hole (9) used as a control cam. Each of the oblong holes (9) comprises a first leg (19), a second leg (11) and a bulging (12) extending upwardly at the end of the second leg (11).

A complete transport apparatus (1') in loading position with wheels (4'a, 4'b) sitting on the axle (3') is shown in FIG. 2, FIG. 3, FIG. 4 and FIG. 5. The arrows C, C' in FIG. 2, FIG. 4 and FIG. 9 indicate the first and second transporting direction of the transport apparatus (1') (1" with respect to FIG. 9) when the same is loaded with a vibration compactor (2) (not shown in FIG. 2 and FIG. 4). The first transporting direction C is opposite to the direction in which the guide bracket of vibration compactor (2) faces (FIG. 6, FIG. 7, FIG. 8, FIG. 9). The direction in which the free end of the guide bracket faces is the second transporting direction C'.

FIG. 2, FIG. 3, FIG. 4, and FIG. 5 show especially clearly the positional relationship between the axle (3') and the compactor foot wraparound (7'). The transport rocker (5') and the oblong holes (9') are arranged in such a way that the devices of the compactor foot receptacle (6') which comprise the compactor foot wraparound (7') and the fork arms (15'a and 15'b) are free from contact with the axle (3') both in the bearing position as well as the transporting position. It is thus ensured that the axle (3') and the transport rocker (5') do not impair one another in their relative mobility. The axle (3') extends in the present embodiment above the compactor foot wraparound (7') in relationship to the ground on which the transport device (1') is positioned.

Figure 3:
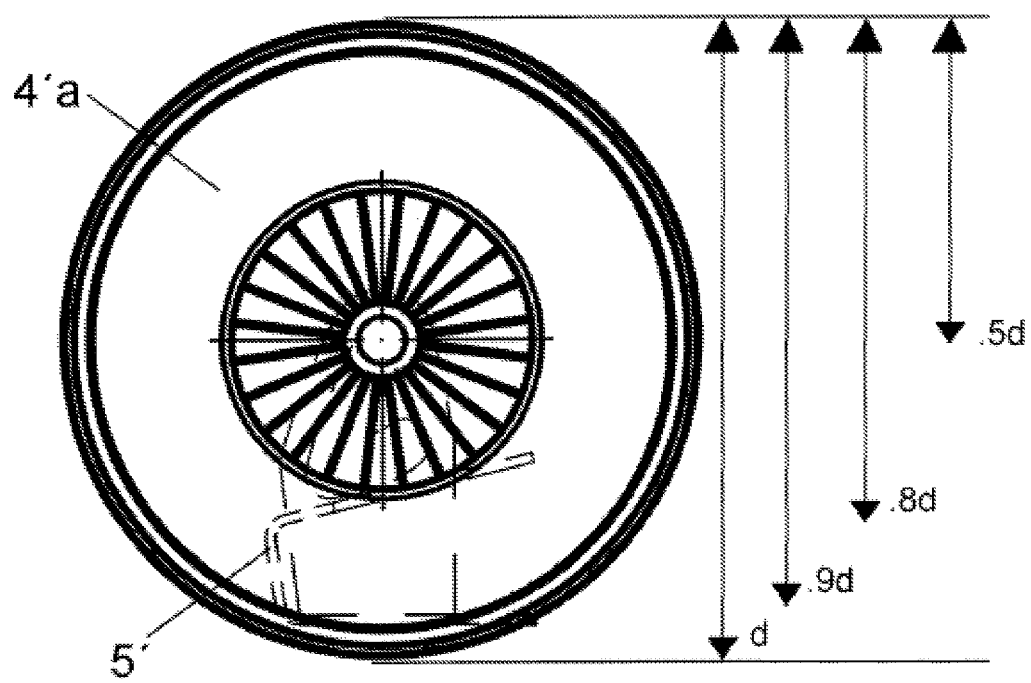
FIG. 3 shows a side view of the transport rocker of FIG. 2 which is coaxial to the axle.

FIG. 3 indicates the transport rocker (5') in the broken line because it is covered by the lateral view of the wheel (4'a) which is positioned at the front in the axial direction. The transport rocker (5') and especially the outer edge (13') of the transport rocker (5') in the direction of the second transport direction (C') is arranged with respect to their dimensioning in such a way that they are covered completely by the wheel (4'*a*) in the axial direction of the axle (3') or are held in a non-projecting manner in the transport device (1') in relationship to the outside diameter (4'*a*/4'*b*) of the wheels (4'*a*/4'*b*). Especially the shaping of the oblong holes (9') in the rocker suspensions (8'*a*/8'*b*) and the bulging (12') is relevant in this respect. Moreover, the upper part and the bottom part of the compactor foot receptacle (6') move towards one another in a funnel-like manner against the first transporting direction (in the direction C') at least in a partial section, so that the threading of the vibration compactor foot (not shown) into the transport rocker (5') is especially unproblematic. The transport rocker (5') is balanced with respect to the axle (3') with respect to weight that the (bottom) surface of the vibration compactor receptacle (6') facing the ground extends parallel to the ground. For the sake of completeness it needs to be mentioned here that similarly a ramp-like balancing which is inclined relative to the ground is possible, thus enabling a facilitated loading of the transport apparatus (1').

Figure 4:
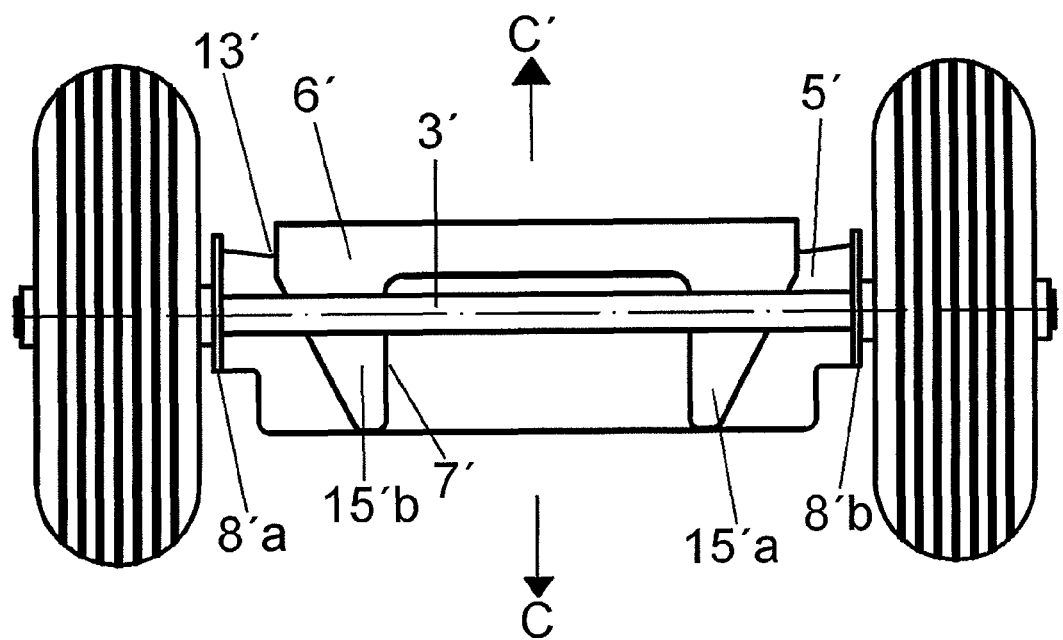
FIG. 4 shows a top view of the transport rocker of FIG. 2.
Figure 5:
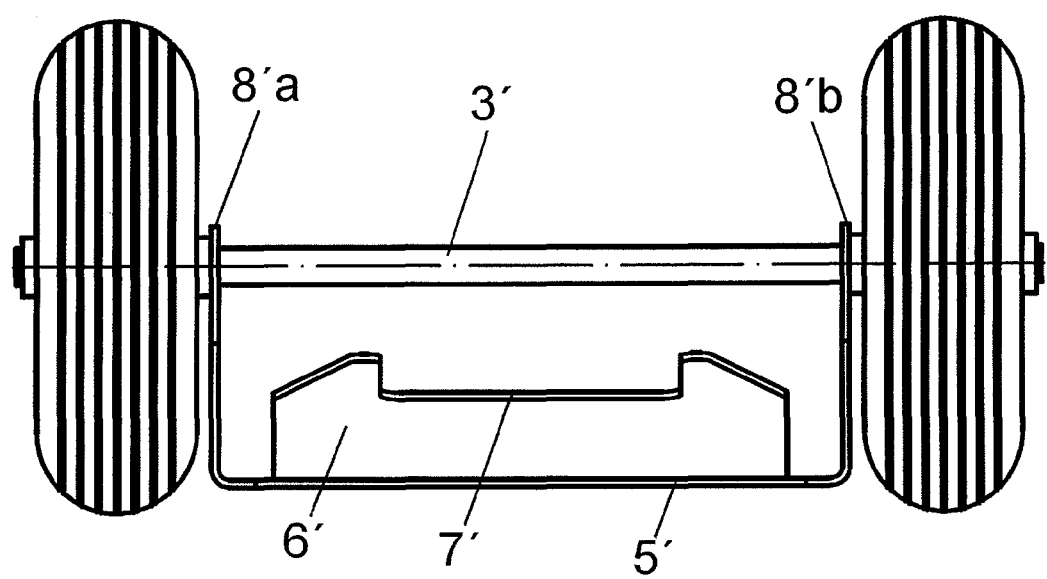
FIG. 5 shows a front view of the transport rocker of FIG. 2.

FIGS. 4 and 5 explain the positioning of the axle (3') above the compactor foot receptacle (6') in relation to the ground. The compactor foot receptacle (6') is suspended on the axle (3') via the rocker suspensions (8'*a*/8'*b*). The top view of FIG. 4 shows further that the compactor foot wraparound (7') with the two fork arms (15'*a*/15'*b*) jointly enclose a cuboid space on three sides. The interaction of these three delimitations of the compactor foot wraparound (7') allow a stable bearing of the vibration compactor because the vibration compactor foot (not shown) cannot be displaced against the first direction of transport (in the direction of arrow C') according to FIG. 4 because the vibration compactor foot is stopped in this direction by a wall region of the compactor foot wraparound (7'). On the other hand, a lateral movement of the vibration compactor is delimited in the axial direction of the axle (3') by partial areas of the compactor foot wraparound (7') formed by the fork arms (15'*a*, 15'*b*) because the components of the vibration compactor which commence from the vibration compactor foot and protrude through the recess formed by the fork arms (15'*a*, 15'*b*) and a partial section of the compactor foot wraparound (7') will in this case meet the stops of the fork arms (15'*a*, 15'*b*) facing these components and are thus limited in their freedom of lateral movement.

Figure 6:
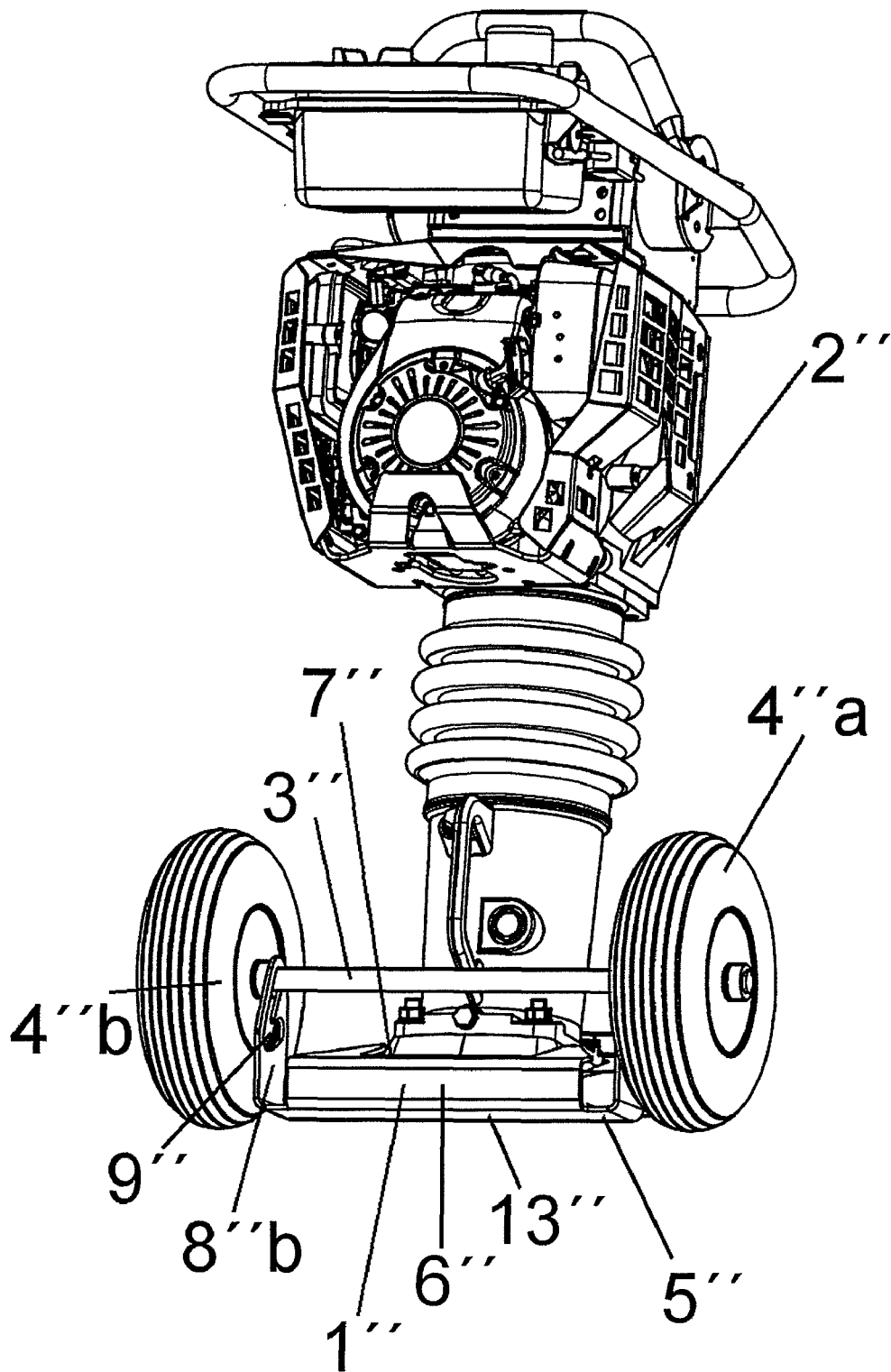
FIG. 6 shows a perspective side view of a transport apparatus in an oblique way from behind in the loading position with a vibration compactor.
Figure 7:
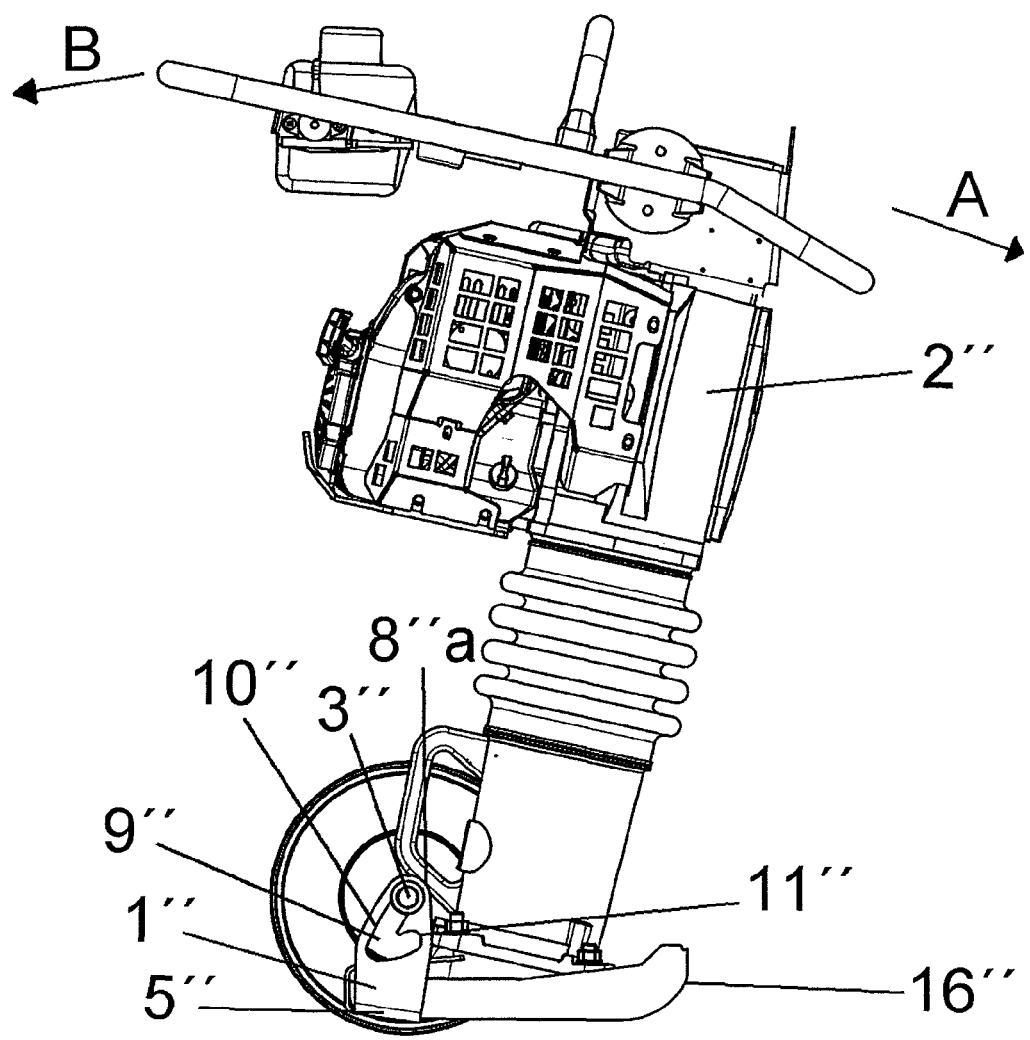
FIG. 7 shows a side view of a transport apparatus in the loading position with a vibration compactor, with a wheel being dismounted.
Figure 8:
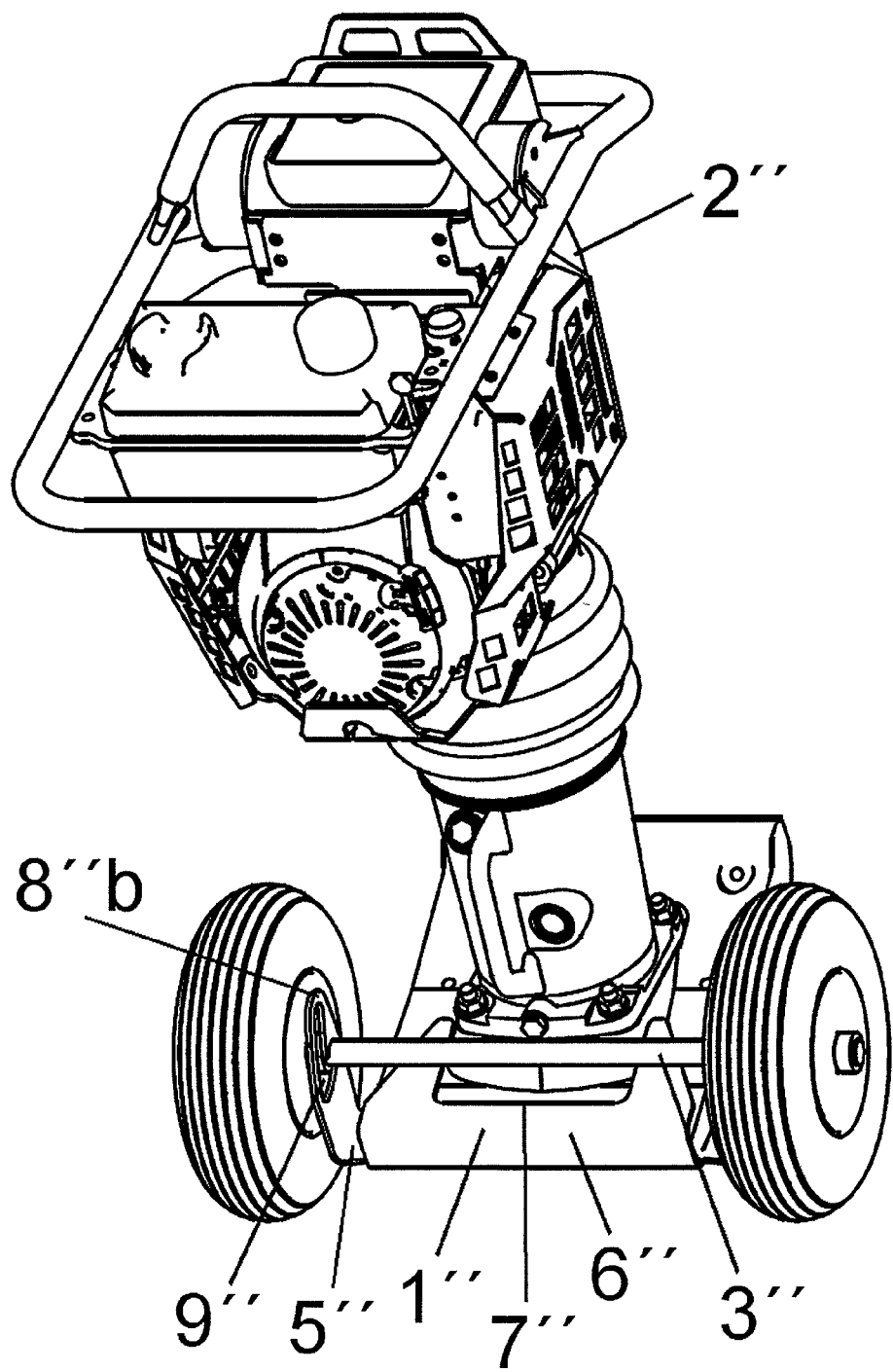
FIG. 8 shows a perspective side view in an oblique manner from behind of a transport apparatus in the transporting position with a vibration compactor.
Figure 9:
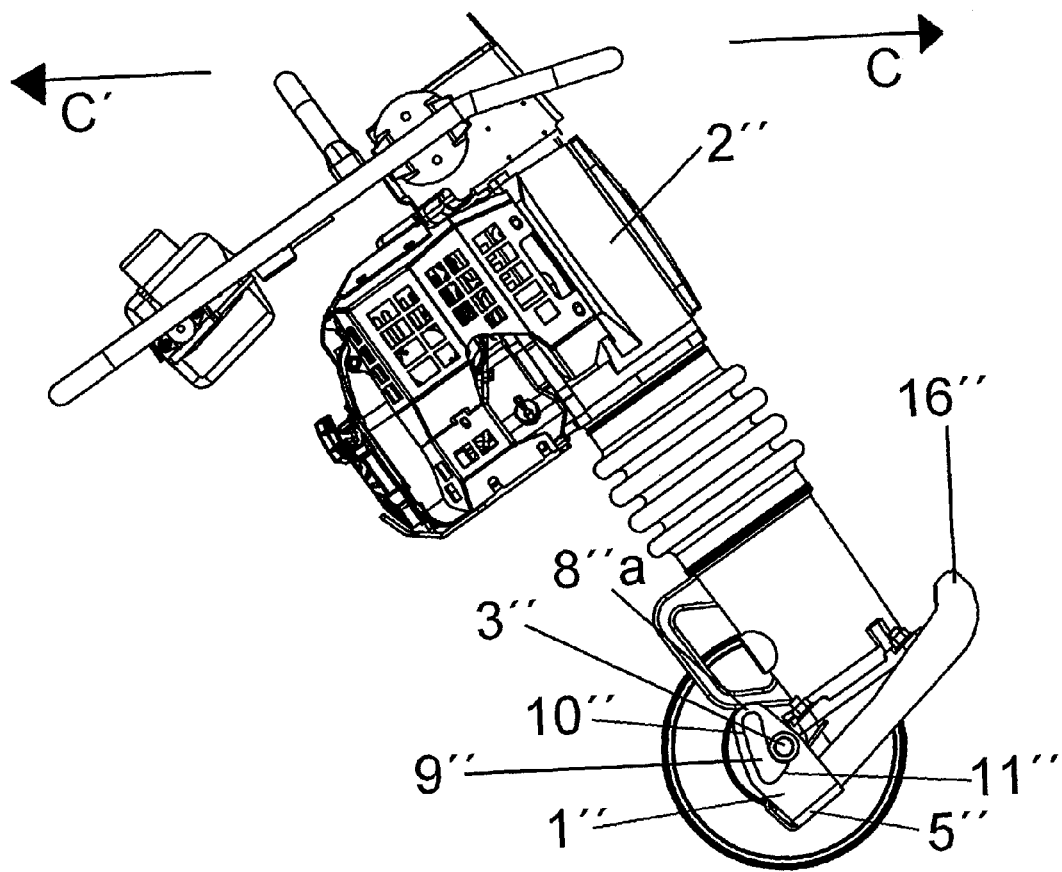
FIG. 9 shows a side view of a transport apparatus in the transport position with a vibration compactor, with a wheel being dismounted.

FIGS. 6, 7, 8, and 9 indicate a loading process of a transport apparatus (1") with a vibration compactor (2). FIGS. 6 and 7 relate to the transport apparatus (1") in the loading position, whereas FIGS. 8 and 9 show the loaded transport apparatus (1") in the transporting position. FIGS. 7 and 9 are sectional views, with the axle (3") being intersected between the wheel (4"*a*) which is on the right in the first transporting direction (arrow C in FIG. 9) and the rocker suspension (8"*a*). The wheel (4"*a*) of the transport apparatus (1") which is on the right side in the first transporting direction is thus not visible in FIGS. 7 and 9. In FIGS. 6 to 9, the compactor foot (16) with its foot end which is at the back in relation to the direction of traveling of the vibration compactor (2) is introduced into the compactor foot receptacle (6") of the transport apparatus (1"). The vibration compactor (2) is thus stable in its upright position because the transport device (1") additionally stabilizes the vibration compactor (2).

Three central sequences of movements can be distinguished for transporting a vibration compactor (2) with the transport apparatus (1") once the transport apparatus (1") with the compactor foot receptacle (6") was pulled over the rear foot end of the compactor foot (16).

In a first phase, the vibration compactor (2) is tilted in a forward direction in the direction of arrow A in the direction of travel of the vibration compactor (2), starting out from the situation of the vibration compactor (2) shown in FIGS. 6 and 7. This is possible for example by lifting the guide bracket. The compactor foot wraparound (7") thus rests on a partial section of the upper side of the compactor foot (16), so that in the case of a continuation of the tilting movement the transport rocker (5") is lifted in the direction of arrow A. The axle (3") accordingly slides in the oblong holes (9") from the bearing position in the first leg (10") to the point at which the first leg (10") meets the second leg (11"). When the motion is continued, the axle (3") subsequently slides along the control cam formed by the second leg (1') in the direction of the transporting position beyond the dead center. The tilting movement in the direction of arrow A is continued until the wheels (4"*a* and 4"*b*) are slightly lifted. It is thus ensured that the axle (3") is in the transport position. The tilting lever is formed by the vibration compactor 2 or the handle which acts as a kind of drawbar.

The vibration compactor 2 is now tilted against the direction of arrow A in the direction of arrow B. The slightly lifted axle (3") hits the bulging (12") in the second leg (11") of oblong hole (9") and accordingly does not slide back in the direction of the first leg (10"). As a result of this latching of the axle (3") in the second leg (11") it is thus ensured that the vibration compactor is lifted in relation to the ground by the tilting movement in the direction of arrow B because the axle (3") in this position is in a position closer to the compactor foot (16). The tilting movement in the direction of arrow B thus ensures that the axle (3") is fixed in the bulging (12"), the vibration compactor (2) is lifted and the total load rests on the wheels. Depending on how the bulging (12") or the second leg (11") is arranged, the clearance to ground, which is the space between the ground and the outside edge of the transport rocker (5") facing the ground, can be factory-set.

Once the unit consisting of vibration compactor (2) and transport apparatus (1") has been tilted into the transport position of FIGS. 8 and 9, the unit is moved by pressing or pushing in the direction of arrow C (first transport direction) in FIG. 9 or pulled in the opposite direction in the direction of arrow C' (second transport direction). FIG. 9 clearly shows the sack-barrow-like general appearance of the vibration-compactor-transport-apparatus unit. No reconfiguration work, special tools or other special measures are necessary for transporting the vibration compactor (2). The vibration compactor (2) is rather jacked up by the tilting movements and can thereafter easily be pushed to another place. During the transport, the axle (3") rests in the two bulgings (12") of the second legs (11").

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

What is claimed is:

1. A transport apparatus for transporting a vibration compactor, the transport apparatus comprising:
    an axle with a wheel being arranged on each of its ends; and
    a transport rocker which is arranged in the axial direction of the axle between the two wheels, said transport rocker comprising a compactor foot receptacle with a compactor foot wraparound, with the compactor foot wraparound being opened in a first transport direction of the transport apparatus and with a rocker suspension with a control cam which determines a loading and transport position for the axle in the manner that by lifting the transport rocker the axle partly runs through the control cam,
    wherein the control cam is a two-leg oblong hole with the axle being held in the loading position in the region of the first leg and in the transport position in the region of the second leg, and
    wherein the first leg is arranged in such a way that the compactor foot receptacle is held in the loading position in a substantially projection-free manner relative to the outside circumference of the wheels,
    wherein the compactor foot wraparound is an arrangement which wraps around and overlaps a portion of each of a bottom side, a lateral side, and an upper side of the compactor foot,
    wherein the compactor foot wraparound has a bottom surface facing the ground and a fork having two fork arms, and
    wherein the two fork arms form a recess and stops to limit the lateral movement of the compactor foot.

2. A transport apparatus according to claim 1, wherein the transport rocker is held at two points in the axle, with the compactor foot receptacle being arranged in the axial direction of the axle between a first bearing and a second bearing.

3. A transport apparatus according to claim 2, wherein elements forming the first and second bearing delimit the compactor foot receptacle in the axial direction of the axle on both sides of the axle.

4. A transport apparatus according to claim 1, wherein the compactor foot receptacle is a receptacle shoe which is arranged to receive the compactor foot in an interlocking manner.

5. A transport apparatus according to claim 1, wherein the control cam is arranged in such a way that the transport rocker is moved in a two-phase movement relative to the axle from the loading position to the transport position, with a sliding phase following an initial lifting phase.

6. A transport apparatus according to claim 1, wherein the oblong hole is provided in the region of the second leg with at least one bulging for securing the axle in the transport position.

7. A transport apparatus according to claim 1, wherein the two-leg oblong hole is substantially L-shaped.

8. A transport apparatus according to claim 1, wherein the two legs are positioned at an acute angle with respect to each other.

9. A transport apparatus according to claim 1, wherein the transport rocker has an integral configuration and is formed by a bending process.

10. A transport apparatus according to claim 1, wherein an outside edge of the compactor foot receptacle is arranged in a transporting direction in the loading position of the transport rocker at a distance to the axle in a range of between 100% and 90% of the wheel diameter.

11. A transport apparatus according to claim 1, wherein an outside edge of the compactor foot receptacle is arranged in a transporting direction in the loading position of the transport rocker at a distance to the axle in a range of between 98% and 94% of the wheel diameter.

12. A transport apparatus according to claim 1, wherein an outside edge of the compactor foot receptacle is arranged against a transporting direction in the transport position of the transport rocker at a distance to the axle in a range of between 80% and 50% of the wheel diameter.

13. A transport apparatus according to claim 1, wherein an outside edge of the compactor foot receptacle is arranged against a transporting direction in the transport position of the transport rocker at a distance to the axle in a range of between 70% and 60% of the wheel diameter.

* * * * *